United States Patent [19]
Bahler et al.

[11] 3,758,884
[45] Sept. 11, 1973

[54] BAND-REJECTION FILTER USING PARALLEL-CONNECTED COMMUTATING CAPACITOR UNITS

[75] Inventors: Lawrence George Bahler, Berkely Heights; Joseph Henry Condon, Summit, both of N.J.

[73] Assignee: Bell Telephone Laboratories, Incorporated, Berkeley Heights, N.J.

[22] Filed: July 24, 1972

[21] Appl. No.: 274,488

[52] U.S. Cl. ................. 333/70 A, 328/167, 333/76
[51] Int. Cl. .......................... H03h 7/10, H03h 7/16
[58] Field of Search ................. 333/70 R, 70 A, 76; 328/165, 167

[56] References Cited
UNITED STATES PATENTS

| | | |
|---|---|---|
| 2,752,491 | 6/1956 | Ringoen ............................ 333/70 A |
| 3,403,345 | 9/1968 | Frank et al. ........................ 328/165 |
| 3,514,726 | 5/1970 | Poschenrieder ................... 333/70 R |
| 3,526,858 | 9/1970 | Heinlein et al. ................... 333/70 R |

Primary Examiner—Rudolph V. Rolinec
Assistant Examiner—Marvin Nussbaum
Attorney—W. L. Keefauver

[57] ABSTRACT

Plural commutating capacitor, 2-terminal, impedance units are included in parallel-connected branch circuits which are, in turn, connected in series in a signal path to suppress a predetermined signal frequency as well as certain harmonic frequency-rejection bands that would otherwise be present if a single commutating capacitor unit were employed. The plural units are essentially the same in structure and are driven for commutation switching at the same frequency but in different phases with respect to one another.

13 Claims, 4 Drawing Figures

PATENTED SEP 11 1973 3,758,884

3,758,884

BAND-REJECTION FILTER USING PARALLEL-CONNECTED COMMUTATING CAPACITOR UNITS

BACKGROUND OF THE INVENTION

1. Field of the Invention

This invention relates to dynamic band-rejection filters utilizing commutating capacitor units.

2. Description of the Prior Art

It is known in the art to employ a commutating capacitor unit as a two-terminal impedance device in substitution for a parallel inductance capacitance (L-C) circuit. The construction, operation, and application of such units are set forth in the copending J. H. Condon U.S. Pat. application Ser. No. 254,384, filed May 18, 1972, which is entitled "Commutating Capacitor Impedance Device," and which is assigned to the same assignee as the present application. Although commutating capacitor units resemble corresponding L-C circuits in certain respects, there are also certain differences. One such difference involves the fact that commutating capacitor units, which display a resonant circuit response at the recurrence frequency of capacitor switching commutation, also display similar responses at certain harmonics of that frequency. For example, a commutating capacitor unit, which is connected in series in a signal path, effects suppression of signals at the commutation frequency $f_0$ of the unit. However, the unit also displays signal suppression and harmonic generation effects at certain harmonics, notably the 5th, 7th, 11th, 13th, et cetera. These are hereinafter designated simply "harmonic effects." In certain electric signal systems, these harmonic effects may appear in or very close to a desired signal passband. Of course, when a unit is working as described in a band-rejection mode, it is difficult to re-establish a desired response characteristic at the harmonic-rejection bands. However, if the unit is being utilized in a bandpass mode, i.e., in which the unit is connected in shunt across the signal path, the closest harmonic which is passed is the 5th; and it can often be excluded by a comparatively simple low-pass filter.

STATEMENT OF THE INVENTION

The foregoing problem of harmonic effects in the output of a band-rejection filter is resolved in an illustrative embodiment of the present invention by connecting plural, substantially identical commutating capacitor units in parallel with one another and in series in a signal path. These units are driven for commutation switching in different phases of the same commutation recurrence frequency. The number of parallel-connected units determines the harmonic rejection band effects and harmonic generation that are suppressed. It is to be noted here that the utilization of the terms "rejection" and "suppression" do not generally indicate total elimination of certain signal components, but they indicate instead a substantial reduction in the response with respect to those components as compared to other signal components which may also appear in the signal path.

BRIEF DESCRIPTION OF THE DRAWINGS

A more complete understanding of the invention and various features, objects, and advantages thereof may be obtained from a consideration of the following detailed description in connection with the appended claims and the attached drawings in which:

DETAILED DESCRIPTION

Figure 1A:
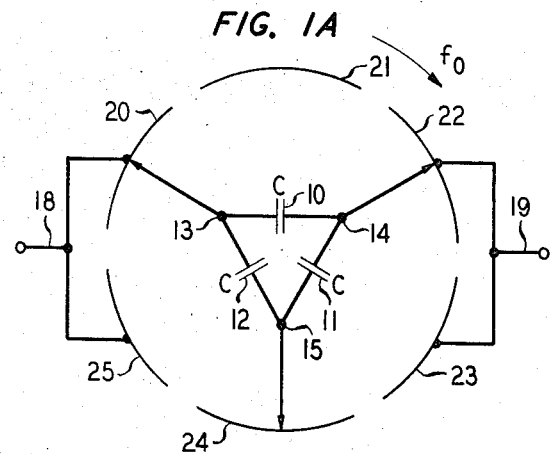
FIGS. 1A and 1B illustrate a schematic diagram of a commutating capacitor unit and a schematic representation of such a unit as employed elsewhere in the drawing.

In FIG. 1A there is presented in simplified form one embodiment of a commutating capacitor unit of the type described in the aforementioned Condon application. Briefly, three capacitors 10, 11, and 12 are connected in a delta circuit configuration having apex terminals 13, 14, and 15, which are connected in different pair combinations between an input connection 18 and an output connection 19 of the unit. The different combinations of connections are achieved by a commutating switching arrangement which, in effect, rotates the delta circuit clockwise at a frequency $f_0$, so that the apex terminals of the delta circuit are alternately brought into contact with different sets of three contacts of a commutating switch which includes contacts 20, 21, 22, 23, 24, and 25. In actual practice the commutating switching is advantageously accomplished by electronic switching arrangements, two of which are disclosed in the aforementioned Condon application. All of the three capacitors of the delta circuit advantageously have approximately the same capacitance C. Signal conditions observed across the device of FIG. 1A, when an electrical signal is applied across the connections 18 and 19, resemble the response of a parallel inductance-capacitance circuit. In particular, maximum response is realized for an input signal frequency which is equal to the commutation frequency $f_0$.

Figure 1B:
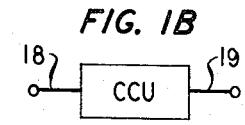

FIG. 1B is a schematic representation of the two-terminal impedance device illustrated in FIG. 1A. This representation is normally considered to include the means, of whatever form, utilized for achieving the commutation switching. However, circuits are separately shown herein for producing drive signals for actuating the switching means.

Figure 2:
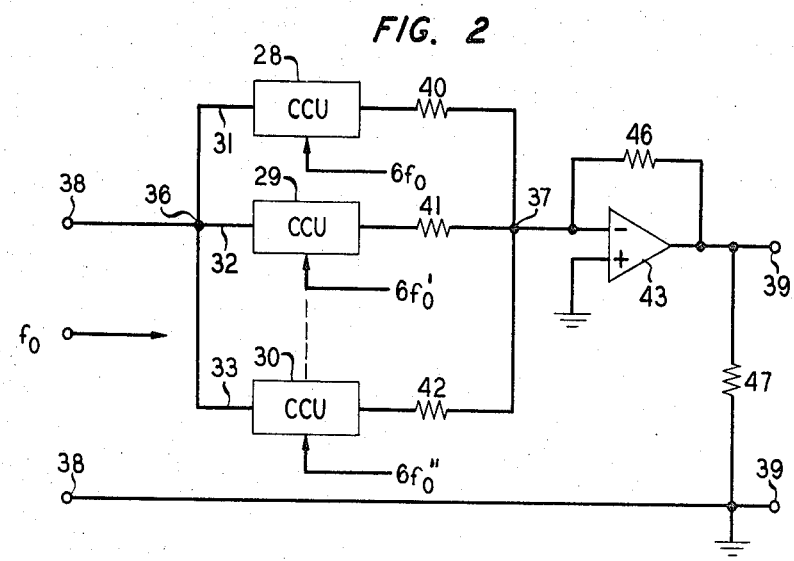
FIG. 2 is a schematic diagram of a band-rejection filter in accordance with the present invention.

FIG. 2 illustrates an unbalanced band-rejection filter circuit utilizing the present invention. Three commutating capacitor units 28, 29, and 30 are connected in series in each of three parallel-connected branch circuits 31, 32, and 33 between terminals 36 and 37 in the through signal path of the filter. One of the filter input terminals 38 is connected directly to the terminal 36 and the other is a ground circuit which extends through the filter to one of the output terminals 39 thereof. Three current limiting resistors 40, 41, and 42 of approximately equal value are connected in series with the commutating capacitor units in the branch circuits 31, 32, and 33, respectively; and, along with the capacitors of those units, they influence the bandwidth of the filter.

An operational amplifier 43 is also connected in series in the through signal path of the filter between terminals 37 and 39; and its inverting, or negative, input connection is directly coupled to the terminal 37. The noninverting input connection of amplifier 43 is connected to ground. A gain determining feedback resistor 46 is provided around the amplifier 43 so that the negative input of the amplifier provides a convenient current summing node for currents from the branch circuits 31, 32, and 33. A terminating resistor 47 may be connected between the output terminals 39.

Although three commutating capacitor units are shown in the band-rejection filter of FIG. 2, either fewer units or more units may be advantageously employed depending upon the filter output response requirements, as will be hereinafter described. All of the units have substantially the same electrical configuration and utilize capacitors of the same capacitance. It has been found that plural commutating capacitor units connected as shown and driven at the same phase and frequency, assuming the units to be substantially identical in structure, actually produce a signal response effect which is similar to that of a single commutating capacitor unit. However, when the units are driven at the same frequency and at appropriately selected different phases with respect to one another, different ones of the aforementioned harmonic effects are suppressed. Thus, the three units in FIG. 2 are supplied with commutation switching drive signals at frequencies $6f_0$, $6f'_0$ and $6f''_0$, respectively, for a filter which is to have the frequency $f_0$ at the center of its fundamental band rejection response. The drive signal $6f'_0$ is advantageously delayed in phase by 20 electrical degrees as measured on the filter input signal wave component at frequency $f_0$ which is to be suppressed. In like manner for the case in which three commutating capacitor units are employed, the unit 30 is driven by a signal $6f''_0$ which is delayed by 40 electrical degrees with respect to the wave $6f_0$ and 20 degrees with respect to the wave $6f'_0$.

In more general terms, it has been found that the phase differences between the drives for the different commutating capacitor units should be 60 degrees/N where N is equal to the number of parallel-connected commutating capacitor unit branch signal paths employed in the filter. Thus, for the case just outlined with respect to FIG. 2, N equals 3; and there is a 20-degree phase difference between successive ones of the drive signals for units 28, 29, and 30.

Figure 3:
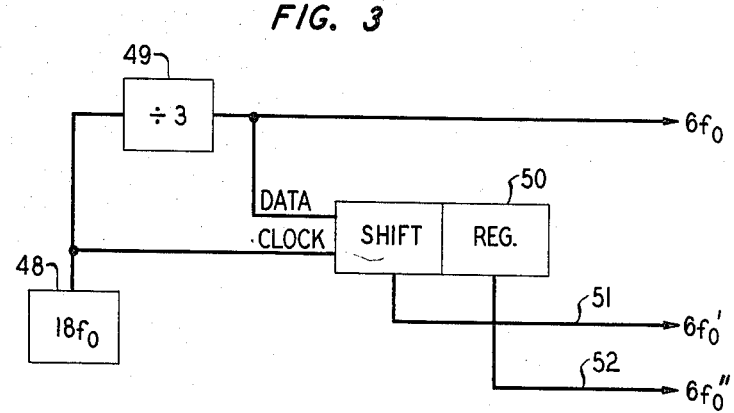
FIG. 3 is a logic diagram of circuits for generating commutating drive signals in different phases for utilization in the filter of FIG. 2.

FIG. 3 illustrates schematically one arrangement for advantageously obtaining the commutating drive signals utilized in FIG. 2. Thus, a master clock source 48 is operated at a frequency $6Nf_0$ which corresponds to $18f_0$ for the example used herein, and its output is coupled through a divide-by-N, where N equals 3 for the example, circuit 49 to produce the $6f_0$ drive signal. The output of circuit 49 is also applied to the data input of an (N-1) shift register 50 which receives shift pulses directly from the source 48. Conventional positive-edge-triggered logic is advantagously employed for circuit 49 and register 50. Thus, by the time the output of circuit 49 changes state in a positive-going sense in response to a positive-going pulse from source 48, the clocking capability of that pulse has passed and register 50 cannot be operated until the next succeeding pulse from source 48. Corresponding outputs on circuits 51 and 52 from the first and second stages, respectively, of register 50 provide the $6f'_0$ and $6f''_0$ signals which differ in phase by 20 degrees and 40 degrees, respectively, with respect to the $6f_0$ signal and by 20 degrees with respect to one another. The aforementioned phase difference measures are, of course, indicated with respect to the $f_0$ input signal at the center of the band-rejection characteristic of the filter in FIG. 2.

It has been previously indicated that a commutating capacitor unit connected in a band-rejection filter arrangement suppresses the fundamental frequency of commutation, as well as all odd harmonics thereof which are not multiples of three. The utilization of parallel-connected, commutating capacitor unit, branch circuits, in series in the signal path of a band-rejection filter, causes further suppression of certain ones of the aforementioned odd harmonic response and generation effects. In general terms, it can be said that all harmonic effects are suppressed except those which are indicated by the expression $(6*N*I\pm 1)$, wherein N is equal to the number of commutating capacitor unit branch circuits, and I is any positive integer.

Thus, if a single commutating capacitor unit is employed in the circuit of FIG. 2, N equals 1 and the harmonic effects which are not suppressed are the 5th, 7th, 11th, 13th, 17th, 19th, et cetera, as I increases. Similarly, if N equals 2 the unsuppressed harmonic effects are the 11th, 13th, 23rd, 25th, 35th, et cetera; and if N equals 3, the unsuppressed harmonic effects are the 17th, 19th, 35th, 37th, et cetera. Thus, it will be seen that as commutating capacitor unit branch circuits are added between terminals 36 and 37 in FIG. 2, the frequency of the lowest harmonic effect which is not suppressed becomes higher; and the spread between adjacent pairs of unsuppressed harmonic effects increases.

The harmonic suppression effect realized in the band-rejection filter of FIG. 2 is understood to occur as a function of the sum of the responses of the parallel-connected branch circuits such as the circuits 31 through 33. Thus, similar harmonic suppression effects can be expected in other circuit applications wherein currents from parallel-connected commutating capacitor unit branch circuits can be summed.

Although the present invention has been described in connection with a particular embodiment, it is to be understood that additional embodiments, applications, and modifications which will be obvious to those skilled in the art are included within the spirit and scope of the invention.

What is claimed is:
1. In combination,
 a plurality N of commutating capacitor units,
 means for connecting said units in parallel signal paths, and
 means for driving said units in different phases with respect to one another for commutating capacitor connections in such units.
2. The combination in accordance with claim 1 in which each of said units comprises,
 an input connection and an output connection,
 a plurality of capacitors interconnected with one another in a circuit having a predetermined number, greater than two, of terminals, and
 means for coupling the terminals of different paired combinations of said terminals to said input and output connections, respectively, in a predeter- mined recurring sequence of time intervals, each of said combinations including in series therebetween at least two of said capacitors.

3. A band-rejection filter comprising, a plurality N of commutating capacitor units, each of said units including a plurality of capacitors connectible in recurrent alternating connection cycles, means for connecting said units in parallel-connected branch paths of a signal path in said filter, and means for driving said units in different phases with repsect to one another for commutating capacitor connections in said units through said recurrent cycles.

4. The filter in accordance with claim 3 in which said driving means comprises, means for driving said units in different phases of the same frequency which are 60 degrees/N apart from the phase of every other one of said units.

5. The filter in accordance with claim 3 in which said driving means comprises, means for fixing said different phases with respect to one another for suppressing all harmonic effects of said filter except those at harmonics satisfying the expression $(6*N*I\pm1)$ wherein I is any positive integer.

6. The filter in accordance with claim 3 in which, two of said units are provided, and said driving means drives said units at the same commutating frequency with thirty degrees difference in phase as measured on the waveform of a signal at the frequency at the center of the fundamental frequency rejection band of said filter.

7. The filter in accordance with claim 3 in which, three of said units are provided, and said driving means drives said units at the same commutating frequency with twenty degrees difference in phase as measured on the waveform of a signal at the frequency at the center of the fundamental frequency rejection band of said filter.

8. The filter in accordance with claim 3 in which, said connecting means comprises a plurality N of current limiting resistors, and means for connecting each of said resistors in series with an output of a different one of said units in its respective parallel-connected branch path.

9. The filter in accordance with claim 3 in which, input and output connections are provided, and said connecting means includes, an operational amplifier, and means for connecting said parallel-connected units and said amplifier in series between said input and output connections.

10. The filter in accordance with claim 9 in which said amplifier comprises an inverting input connection which is connected in said series signal path to a common terminal of said parallel-connected units which is remote from said input connections, said amplifier also includes a noninverting input connection which is coupled to a reference potential, and a feedback resistor is connected between an output of said amplifier and said inverting input connection.

11. The filter in accordance with claim 10 in which, said output connections include a terminating resistor connected therebetween, and means for connecting one of said output connections to said reference potential terminal.

12. The filter in accordance with claim 3 in which said signal path wherein said parallel-connected commutating capacitor units are connected is a series signal path connecting an input terminal of said filter with its corresponding output terminal.

13. The combination in accordance with claim 1 in which each of said units comprises, a plurality of capacitors interconnected with one another, and means for commutating said interconnected capacitors through a predetermined sequence of connection combinations between input and output connections of said unit, each of said combinations including a plurality of capacitors connected between said input and output connections and each such capacitor being included in at least two of said combinations in said sequence.

* * * * *